Patented Mar. 4, 1941

2,233,999

UNITED STATES PATENT OFFICE 2,233,999

PROCESS FOR THE PRODUCTION OF 2,3,4,5-TETRAHYDROTHIOPHENE-1,1-DIOXIDE

Mark W. Farlow, Wilmington, Del., assignor to E. I. du Pont de Nemours & Company, Wilmington, Del., a corporation of Delaware No Drawing. Application April 30, 1940, Serial No. 332,451

3 Claims. (Cl. 260—329)

This invention relates to a catalytic process for hydrogenating an unsaturated sulfur compound to produce the corresponding saturated derivative and, more specifically, to the production of 2,3,4,5-tetrahydrothiophene-1,1-dioxide.

It is an object of this invention to provide a simple and direct process for the production of 2,3,4,5-tetrahydrothiophene-1,1-dioxide. Another object is to provide an economical process for the production of 2,3,4,5-tetrahydrothiophene-1,1-dioxide in high yields and in easily recoverable form. Other objects will be apparent from the following description of the invention.

These objects are accomplished by the following invention which comprises contacting 2,5-dihydrothiophene-1,1-dioxide in the liquid phase or in solution in a solvent with hydrogen in the presence of a base metal hydrogenation catalyst at a temperature below that at which 2,5-dihydrothiophene-1,1-dioxide undergoes thermal decomposition, thereby obtaining 2,3,4,5-tetrahydrothiophene-1,1-dioxide. This is a most remarkable result for in general the base metal hydrogenation catalysts have been considered to be unsuited for the hydrogenation of such sulfur compounds. In fact, traces of sulfur or sulfur-containing impurities, because of their poisoning action on base metal hydrogenation catalysts, are as a rule rigorously excluded from substances which are to be hydrogenated.

More specifically, this invention comprises hydrogenating 2,5-dihydrothiophene-1,1-dioxide in the presence of an alloy-skeleton nickel catalyst. This reaction proceeds rapidly and quantitatively under very mild conditions of temperature and hydrogen pressure. The unsaturated dioxide decomposes at elevated temperatures, chiefly into sulfur dioxide and butadiene-1,3. The rate and extent of its decomposition at a given temperature may vary somewhat depending upon the conditions used. Since the hydrogenation reaction is exothermic it is desirable to use the minimum amount of catalyst consistent with a reasonably rapid rate of hydrogenation and to provide efficient means for removing the heat of reaction. The temperature of hydrogenation is more easily controlled, of course, when the reaction is carried out in the presence of a solvent.

2,5-dihydrothiophene-1,1-dioxide, sometimes called butadiene cyclic sulfone, may be prepared by the well known method of Staudinger and Ritzenthaler, Ber. 68, 455 (1935).

By way of illustrating a preferred method of operating according to the present invention, the following specific example is given. Parts are by weight.

Example I

A nickel catalyst was prepared by dissolving the aluminum from a finely divided alloy containing equal parts of aluminum and nickel with the aid of a solution of caustic soda in the usual manner. The residual nickel was washed with water, then with alcohol, and was used as a thick paste in ethanol. One hundred parts of 2,5-dihydrothiophene-1,1-dioxide, 34 parts of the alloy-skeleton nickel catalyst, prepared as described above, and 170 parts of 95% ethanol were charged into a pressure vessel. The vessel was closed, pressured with hydrogen to a pressure of 40 to 50 lbs. per sq. in., and the reaction mixture agitated. The absorption of hydrogen began at room temperature and was accompanied by the liberation of heat. Hydrogen absorption ceased after five minutes indicating the reaction was complete. The reaction vessel was opened and the reaction mixture filtered to remove the catalyst. Distillation of the filtrate gave 100 parts (98.5% of the theoretical) of 2,3,4,5-tetrahydrothiophene-1,1-dioxide, B. P. 134° to 136° C./8 mm., a colorless solid which melted at 27° to 28° C.

When the catalyst/hydrogen acceptor ratio is 1%, in place of 34% as above, the reaction is considerably slower at room temperature, requiring seven hours for 85% of the theoretical hydrogen absorption to occur.

The process is operable at room temperature and temperatures up to those at which 2,5-dihydrothiophene-1,1-dioxide begins to decompose. As previously stated, this decomposition temperature will depend somewhat on other conditions, but is in the neighborhood of 120° to 125° C. The preferred operable temperature range is 0° to 125° C.; however, lower temperatures may be used, the reaction being operable at any temperature at which hydrogen absorption takes place.

The process is operable in the presence of any solvent which is inert toward the starting material and product; for example, water, ethyl alcohol, dioxane, etc. The reaction may be carried out in the absence of a solvent, however, if desired. Since 2,5-dihydrothiophene-1,1-dioxide, is a solid melting at about 65° C., when operating in the absence of a solvent it is necessary to carry out the reaction at a temperature at which the 2,5-dihydrothiophene-1,1-dioxide is at least partly molten.

Any positive hydrogen pressure can be used.

The optimum hydrogen pressure depends on many other variables among which may be mentioned the type and activity of the catalyst, the rate of reaction desired, and the pressure capacity of the equipment used.

Any base metal hydrogenation catalyst may be used. Catalysts of the ferrous metal group, for example, cobalt or nickel, are preferred and nickel catalysts are particularly suitable because of their availability and low cost. The optimum ratio of catalyst to hydrogen acceptor depends on the nature of the catalyst, the hydrogen pressure, and other variables, and can easily be determined by a few trial runs with varying ratios.

It is apparent that many widely different embodiments of this invention may be made without departing from the spirit and scope thereof and therefore the invention is not intended to be limited except as indicated in the appended claims.

I claim:

1. A process for the production of 2,3,4,5-tetrahydrothiophene-1,1-dioxide which comprises bringing 2,5-dihydrothiophene-1,1-dioxide in the liquid phase, in the presence of a base metal hydrogenation catalyst, into contact with hydrogen at a temperature below that at which said 2,5-dihydrothiophene-1,1-dioxide undergoes thermal decomposition.

2. A process for the production of 2,3,4,5-tetrahydrothiophene-1,1-dioxide which comprises bringing 2,5-dihydrothiophene-1,1-dioxide in the liquid phase, in the presence of a nickel hydrogenation catalyst, into contact with hydrogen at a temperature within the range of 0° to 125° C.

3. A process for the production of 2,3,4,5-tetrahydrothiophene-1,1-dioxide which comprises bringing 2,5-dihydrothiophene-1,1-dioxide in the liquid phase, in the presence of a cobalt hydrogenation catalyst, into contact with hydrogen at a temperature below that at which said 2,5-dihydrothiophene-1,1-dioxide undergoes thermal decomposition.

MARK W. FARLOW.